（12) United States Patent
Schaefer

(10) Patent No.: US 6,972,690 B1
(45) Date of Patent: Dec. 6, 2005

(54) SYSTEM AND METHOD FOR TRANSMISSION OF ELECTRICAL SIGNALS IN IMPERFECTLY-CONDUCTING MEDIA

(75) Inventor: Philip P. Schaefer, Sedona, AZ (US)

(73) Assignee: Vortant Technologies LLC, Weaverville, NC (US)

( * ) Notice: Subject to any disclaimer, the term of this patent is extended or adjusted under 35 U.S.C. 154(b) by 626 days.

(21) Appl. No.: 10/014,414

(22) Filed: Dec. 14, 2001

Related U.S. Application Data

(60) Provisional application No. 60/255,852, filed on Dec. 15, 2000.

(51) Int. Cl.[7] .............................................. H04B 13/00
(52) U.S. Cl. ..................................... 340/850; 340/852
(58) Field of Search .......................... 340/850, 310.01, 340/310.02, 310.05, 310.07, 310.08; 367/14; 181/101; 324/323, 347; 73/53.01

(56) References Cited

U.S. PATENT DOCUMENTS

| | | | |
|---|---|---|---|
| 4,207,568 A | * | 6/1980 | MacLeod .................... 340/852 |
| 5,467,011 A | * | 11/1995 | Hunt ........................... 324/67 |
| 6,285,742 B1 | * | 9/2001 | Haumann et al. ........... 378/116 |

OTHER PUBLICATIONS

Jordan & Balman, "Electromagnetic Waves and Radiating Systems", Pretence Hall, 1968, Chapter 5.
Urick, R.J., "Principles of Underwater Sound," 3rd Edition, McGraw Hill Book Company, New York, 1983.
Kilgore, Kevin et al., "An Implanted Upper-Extremity Neuroprosthesis," Journal of Bone and Joint Surgery, vol. 79-A, Nr4, Apr. 1997.

* cited by examiner

*Primary Examiner*—Michael Horabik
*Assistant Examiner*—Hung Dang
(74) *Attorney, Agent, or Firm*—David C. Isaacson; Pillsbury Winthrop Shaw Pittman LLP

(57) ABSTRACT

A system for transmitting a signal through an imperfectly-conducting medium includes a transmitter station and a receiver station. The transmitter station has a transmitter and at least one conductor. The receiving station has at least one conductor and a receiver. The transmitter causes a current to flow from the transmitter conductor to the receiver conductor through the imperfectly-conducting medium. Associated with the current flow is an electric field. Because the current flow varies with the signal, the electric field varies with the signal. The receiving conductor senses the electric field and provides a signal to the receiver which detects the signal to be transmitted. The receiving station then passes the signal to an output device to be output.

21 Claims, 20 Drawing Sheets

SYSTEM AND METHOD FOR TRANSMISSION OF ELECTRICAL SIGNALS IN IMPERFECTLY-CONDUCTING MEDIA

This application claims the benefit of U.S. Provisional Application No. 60/255,852 filed Dec. 15, 2000, which is hereby incorporated by reference herein in its entirety.

BACKGROUND

1. Field of the Invention

The present invention relates to transmitting signals in imperfectly-conducting media. More specifically, the present invention relates to using an electric field to transmit signals through or near water, the earth, or other imperfectly-conducting media.

2. Background of the Invention

Transmitting signals through imperfectly-conducting media is a notoriously difficult problem. A major reason for this difficulty is that imperfect conductors severely attenuate radio waves traveling through them. This is because, as discussed in Jordan and Balman, "Electromagnetic Waves and Radiating Systems", Prentice-Hall, 1968, Chapter 5, conductivity causes attenuation of the electric field component of the oscillating electric/magnetic energy wave, such as a propagating radio signal. This attenuation renders radio communication under water nearly impossible. Even where possible, such communication is generally impractical. Consequently, its use is limited to only a few applications. For example, using very low frequencies and very high power levels, radio waves can be transmitted into deep water. Thus, communications with submarines generally require high power transmitters that transmit signals containing frequencies below approximately 10 KHz.

Largely because of the difficulties associated with transmitting electromagnetic waves through imperfectly conducting media, most systems that try to transmit signals through such media use acoustic energy, rather than electromagnetic energy. Examples of such systems are found in the "DiveLink" ultrasonic system sold by Divelink, Inc. and the "Buddy Phone" sold by Ocean Technology, Inc. However, acoustic systems also suffer from a number of drawbacks. One drawback is that, like electromagnetic waves, acoustic waves suffer significant attenuation in water or earth. See Urick, R. J., "Principles of Underwater Sound", 3d Edition, McGraw-Hill Book Company, New York, 1983.

Another drawback is that natural or man-made noise can interfere with acoustic systems. For example, acoustic noise from surf or storms or engine noise from nearby boats can dramatically affect the performance of underwater acoustic communication.

Another problem with acoustic signaling arises from reflections that can occur when properties of the medium through which an acoustic wave propagates vary. An exemplary change in a property of a medium is a thermocline in water. Although useful in some applications such as SONAR, reflection of acoustic waves in a communication system is generally detrimental to the communications. For example, due to the relatively slow speed of sound propagation in water, reflection of acoustic waves can lead to severe multi-path interference, which causes degradation in intelligibility and loss of communication bandwidth. Moreover, in some cases, the reflection is so severe that it causes complete loss of signal results due to reflection of the acoustic signal wave away from the desired transmission path.

There has been little research exploring the use of the conductivity of the medium as a feature, rather than a detriment, to communication systems. In U.S. Pat. No. 4,207,568 to MacLeod, a communication link is described that uses the bulk conductivity of water for one side of a transmission circuit, and a water-filled, flexible insulating tube as the other side of the circuit. Although this approach avoids the problems of non-flexible conductive wires, it requires the tube to make a physical connection between the ends of the communication link. Consequently, it is limited in its application.

SUMMARY OF THE INVENTION

The present invention solves the foregoing problems of conventional communication systems by creating an electric field, and using the electric field to transmit signals through an imperfectly-conducting medium. The present invention changes the properties of the electric field in accordance with the desired signals to be transmitted.

In one embodiment of the present invention, signals are transmitted within and through an imperfectly conducting media by use of an electric field. The invention includes one or more conductors that are used at the transmitter to create an electric field in the medium. Similarly, one or more conductors are used at the receiver to extract the signal from the medium. Rather than using electromagnetic radiation, which relies on the interchange of energy between traveling magnetic and electric fields, and hence, is severely attenuated by conductivity, the invention uses the electric field alone as its basis of operation. Rather than attenuating the field, the conductivity of the medium is compatible with the flow of conductive current, which accompanies the desired electric field.

In another embodiment of the present invention, signals are generated at or near the surface or boundary of the imperfectly conducting medium. Using such a configuration, the invention can also be used in this embodiment as a relatively efficient antenna for propagating radio signals along the surface or boundary of the medium, such as along the surface of a body of water. When used in this way, the invention creates an electric field using one or more conductors, but the generation and propagation of electromagnetic energy is possible in the nearby non-conducting medium, such as the atmosphere adjacent to the conducting medium.

As described below, either type of operation is possible using essentially identical apparatus.

DETAILED DESCRIPTION OF THE INVENTION

The present invention is based on the creation of an electric field within an imperfectly-conducting medium. The electric field can also be created adjacent to a boundary of the imperfectly-conducting medium.

Figure 1:
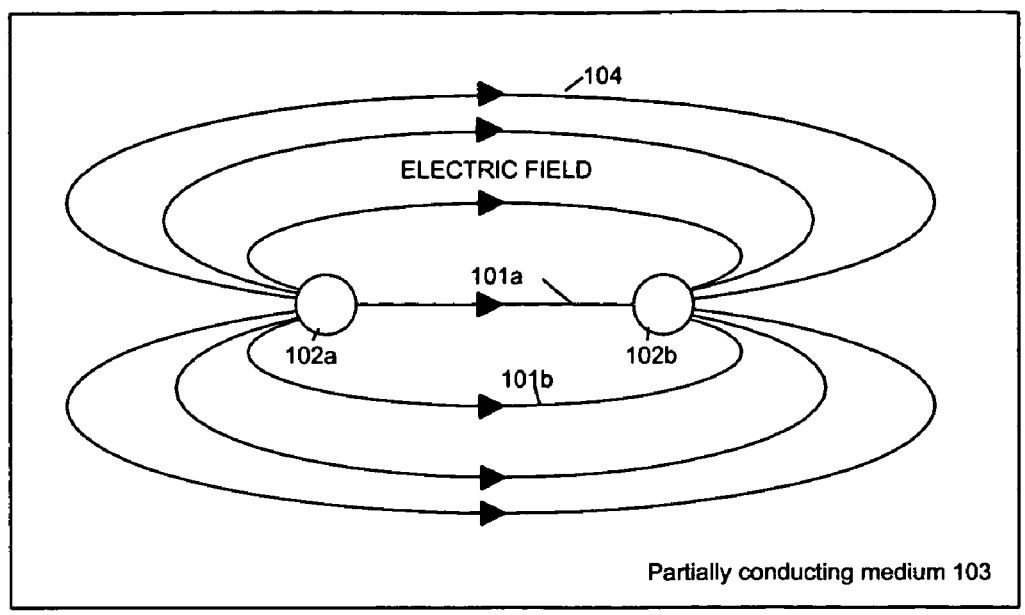
FIG. 1 is a schematic diagram illustrating the electric field accompanying a current flow.

FIG. 1 is a schematic diagram illustrating the basis of operation of the present invention. As illustrated in FIG. 1, two conductors 102a and 102b are submerged in an imperfectly-conducting medium 103. An electrical signal is applied between conductors 102a and 102b. A current flows between conductors 102a and 102b as a result of the applied electric signal. FIG. 1 shows the lines of conduction current 101a, 101b that result between conductors 102a and 102b. The lines of current flow 101a and 101b actually extend to infinity within the medium. The lines shown in FIG. 1 depict only a few typical lines of current flow.

As is well known, electrical current flow is associated with an electric field along which the current flows. The lines of conduction also indicate the geometry of an electric field 104 that exists in imperfectly conducting medium 103. Electric field 104 exists along the lines of current flow in the partially-conducting medium to cause that current flow.

Preferably, an AC signal is applied to conductors 102a and 102b to generate an alternating electric field. The electric field produced by the conductors corresponds to the lines of conduction shown in FIG. 1. Although radio frequency radiation over significant distances is not feasible through the imperfectly-conducting medium, the electric field alone can be used for signal transmission. Thus, the present invention uses the electric field associated with the electrical current flow to transmit the signal, rather than relying upon electromagnetic wave propagation. The function of conductors 102a and 102b is analogous to the function of an antenna in a conventional radio station. However, the mechanism by which the conductors function is substantially different than a radio antenna. Conductors 102a and 102b are designed to have relatively large surface area, so that conduction between the conductors is as large as possible to maximize electric field generation and current flow. In standard antenna designs that may appear similar to the conductor pair 102a and 102b, but used in the air (for example, an end-loaded dipole antenna), essential radiation is expected from the wires or tubes leading to the conductors. In the case of a conventional antenna therefore, the conductors typically serve as capacitive, rather than conductive, elements.

By contrast, in the present invention, the leads to conductors 102a and 102b do not directly generate the field which is the basis of operation of the device. The important characteristic of the present invention is, instead, the conduction of electrical current between the conductors, which would be an undesirable effect in an electromagnetic antenna.

Another characteristic of the transmitting and receiving conductors in the present invention is the low overall impedance of the transmitting and receiving conductor pairs. Because of the conductive nature of the transmission mechanism, the impedance of a pair of conductors, of small dimensions, (tens of centimeters) closely spaced (several meters) and at reasonably low frequencies (less than 100 kHz), in conductive media such as water, will have a primarily resistive impedance of ohms to tens of ohms. This impedance is radically different than a similar-looking antenna in air, due to the different function of the parts. Because the received signal is developed across a low impedance, there will be more signal power available between the conductors at the receiver than between similar conductors in air.

Figure 2:
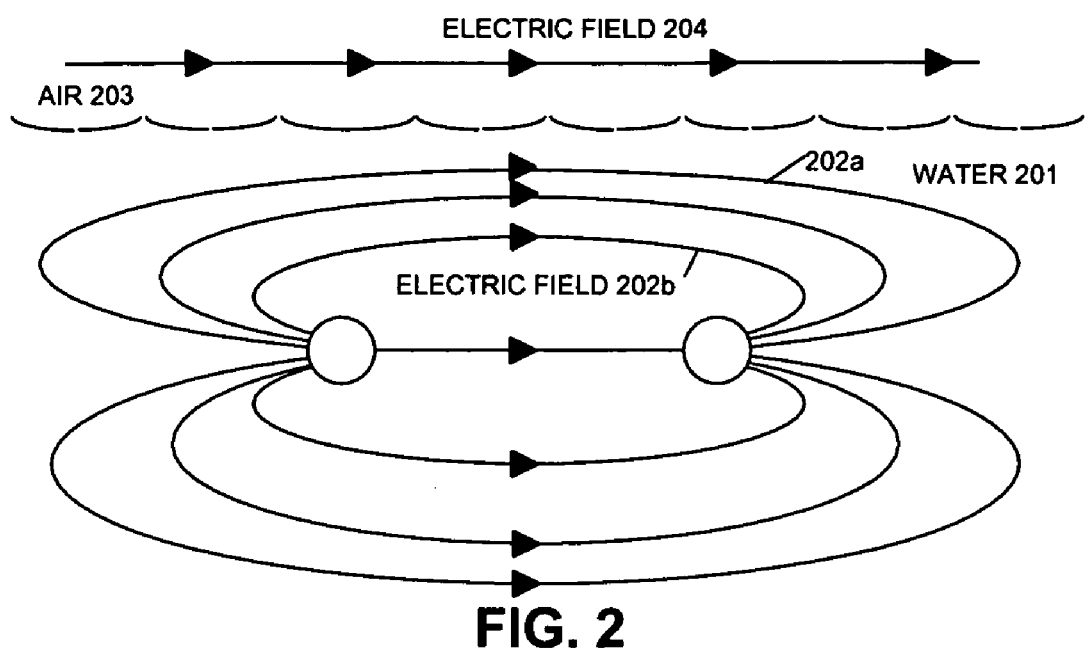
FIG. 2 is a schematic diagram illustrating the electric field accompanying a current flow that is constrained by medium boundaries.

FIG. 2 depicts the conduction and fields when near the surface of an imperfectly conducting medium 201, for example, water. FIG. 2 shows the lines of electric field and conductive current flow 202a, 202b in water 201 near the surface of the water. As shown in FIG. 2, near the surface, the field is warped somewhat to remain within the conductor because conduction current cannot flow through air. However, the electric field at the surface of the water induces an electric field 204 in the air 203 just above the water. In-air 204 field becomes the source of a radiated radio wave, if the frequency is high enough, for example, for frequencies above 100 kHz.

Figure 3:
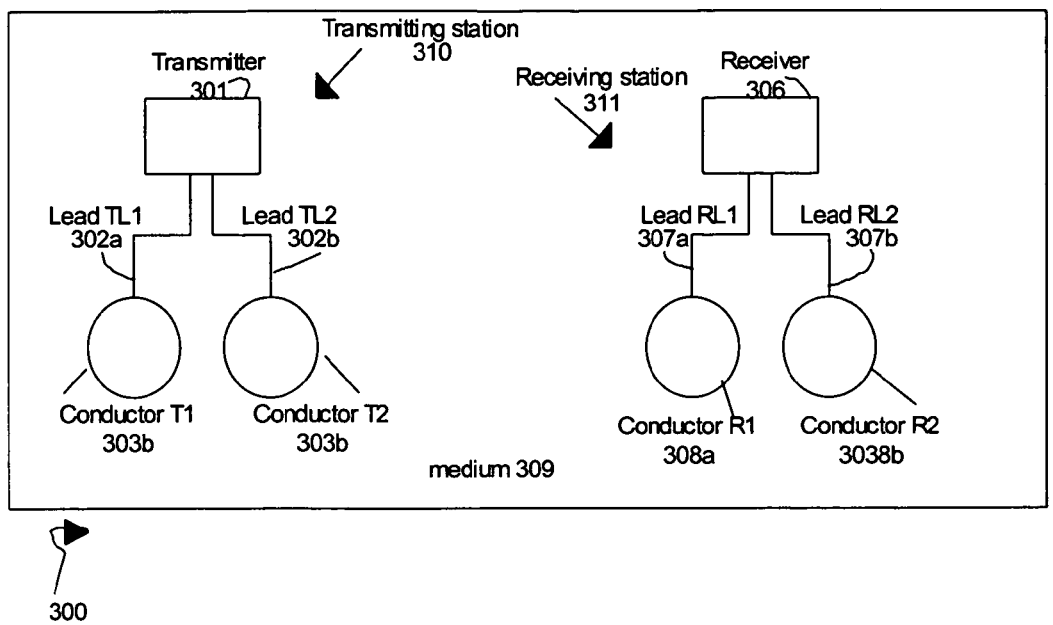
FIG. 3 is a schematic diagram for using an electric field to transmit and/or receive signals in an imperfect conductor according to the present invention.

To transmit signals using the present invention, at least one transmitter and at least one receiver station are required. FIG. 3 is a schematic diagram of a preferred embodiment of a signal transmission system 300 according to the present invention. As shown in FIG. 3, System 300 is preferably contained within imperfectly conducting medium 309. Exemplary imperfect conducting mediums include water and earth. System 300 includes a transmitting station 310 and a receiving station 311. Transmitting station 310 includes a transmitter 301. Transmitter 301 generates electrical signals on leads 302a and 302b. Leads 302a and 302b are preferably insulated to minimize conduction of current from other than the intended conductors 303a and 303b.

Leads 302a and 302b are preferably the inner and outer conductors of a length of coaxial cable such as RG-58A. Alternatively, leads 302a and 302b can be lengths of insulated wire such as #22 stranded wire. Leads 302a and 302b are connected to conductors 303a and 303b. Receiving station 311 comprises a receiver 306. Receiver 306 receives input signals via leads 307a and 307b. Leads 307a and 307b are preferably of the same type as leads 302a and 302b. The leads 307a and 307b are connected to receiver conductors 308a and 308b.

Conductors 303a and 303b create an electric field in the imperfectly-conducting medium 309. Conductors 308a and 308b detect an electric field in the imperfectly-conducting medium 309, due to the potential difference caused by the field at the locations of conductors 308a and 308b. Generally, as the surface area of the conductors increases, the strength of the generated and/or received signal also increases. The conductors can be made of highly-conductive materials such as metals. One such metal that can be used in the present invention is aluminum. Alternatively, less well-conducting substances can be used. In an embodiment of the present invention, aluminum sheets are used for conductors 303a, 303b, 308a and 308b. Preferably, the aluminum sheets have dimensions of approximately 50 cm by 30 cm. Other shapes and materials can be used, depending on the application. For short-range or high-power applications, the conductors could be smaller. The foregoing structure and function described for conductors 303a, 303b, 308a and 308b apply to the conductors described below in each of the embodiments of the present invention.

Figure 4:
FIG. 4 is a schematic diagram of an orientation of the conductors according to an embodiment of the present invention.

The distance between the conductors 303a and 303b and between conductors 308a and 308b also affects performance of a transmission system according to the present invention. For a portable system, the distance between conductors 303a and 303b, and the distance between conductors 308a and 308b is preferably 3 meters. The orientation of transmitting and receiving conductors can also affect the performance of signal transmission according to the present invention. Generally, signals are strong when the conductors are aligned in a collinear array. FIG. 4 is a schematic diagram illustrating a collinear orientation of the conductors to achieve a relatively high signal strength. In FIG. 4, transmitter conductors 401a and 401b are shown aligned collinear to receiver conductors 402a and 402b. For clarity, the leads and transmitter and receiver electronics are not shown in this diagram, but are as described above.

Figure 5:
FIG. 5 is a schematic diagram of an orientation of the conductors according to another embodiment of the present invention

Strong signals are also present when the conductors are aligned in a broadside manner. FIG. 5 is a schematic diagram illustrating a broadside alignment of conductors. In FIG. 5, transmitter conductors 504a and 504b are shown in broadside orientation with respect to receiver conductors 506a and 506b.

Figure 6:
FIG. 6 is a schematic diagram of an orientation of the conductors according to yet another embodiment of the present invention.

Signals are generally weakest when the conductors are aligned perpendicular to one another. FIG. 6 is a schematic diagram illustrating a perpendicular alignment of transmitter and receiver conductors. In FIG. 6, transmitter conductors 601a and 601b are shown oriented perpendicular to receiver conductors 602a and 602b.

Figure 7:
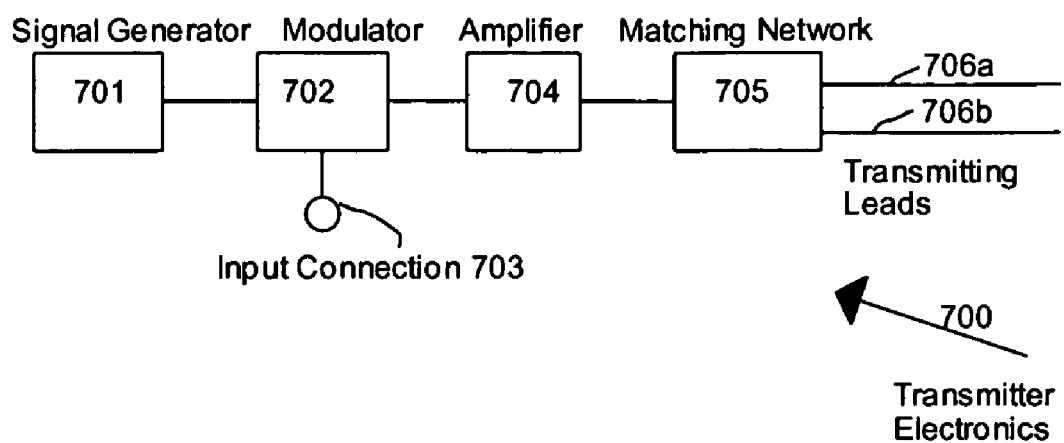
FIG. 7 is a schematic diagram of a transmitter according to an embodiment of the present invention.

FIG. 7 is a schematic diagram of a transmitter 700 according to an embodiment of the present invention. A desired communication signal or other input signal is applied to input connection 703. A signal generator 701 generates a carrier signal. Preferably, the carrier signal has a carrier frequency in the range from 10 Hz to 100 MHz. For most applications, the carrier frequency falls in the range from 5 kHz to 10 MHz range. For transmission of signals within and through a medium such as water, the low end of the frequency range is preferred. For transmission of signals along the surface of the medium, the higher end of the frequency range is preferred. The carrier signal can be generated using a crystal-controlled oscillator. Generation of a carrier signal using a crystal-controlled oscillator is well-known to those skilled in the art.

A modulator 702 modifies the signal in accordance with a desired modulation mode. The preferred modulation mode is frequency shift keying (FSK). The modulated signal is applied to a power amplifier 704. Power amplifier 704 can be a circuit using well-known audio amplifier integrated circuits, for example, National Semiconductor, Inc.'s LM384. Power amplifier 704 increases the signal strength. For short-range, portable communication, a power amplifier 704 preferably increases signal strength to the 0.1-to-5-watt range. For longer-distance communication, power amplifier 704 may need to increase signal strength to significantly higher levels. A matching network 705 couples the amplified signal to transmitting leads 706a and 706b. Transmitting leads 706a and 706b are connected to the transmitter conductors. For fresh water transmission, matching network 705 is preferably a 1:4 impedance ratio broadband transformer. For saltwater transmission, matching network 705 is preferably a 4:1 impedance ratio broadband transformer. It will be apparent to one of ordinary skill in the art that other circuits, for example, those used in audio or RF designs, can be adapted for use in transmitter 700 to provide electrical current to leads 706a and 706b.

Figure 8:
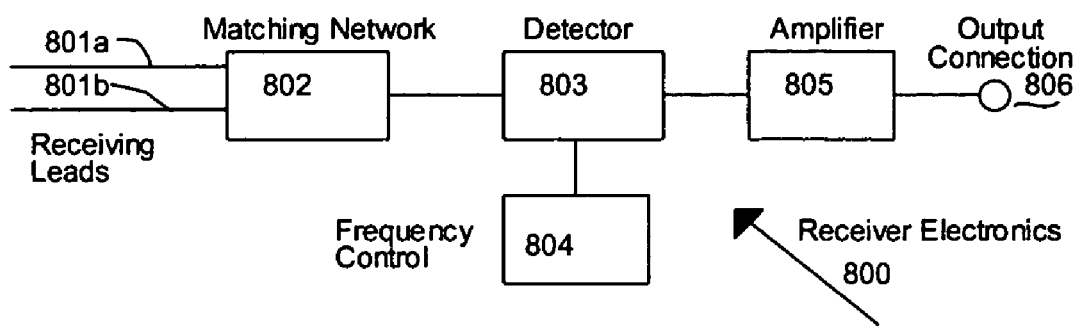
FIG. 8 is a schematic diagram of a receiver according to an embodiment of the present invention.

FIG. 8 is a schematic diagram of a receiver 800 according to an embodiment of the present invention. A pair of leads 801a and 801b is connected to the receiver conductors. The other end of leads 801a and 801b are coupled to an impedance matching network 802. For use in fresh water, impedance matching network 802 is preferably a 1:20 impedance ratio broadband transformer. For use in saltwater, impedance matching network 802 is preferably a 1:300 impedance ratio broadband transformer.

The transformed signal is applied to a detector 803. When the preferred FSK modulation is used, detector 803 is preferably an FSK detector to demodulate the received signal. When other modulation techniques are used, detector 803 will use their corresponding demodulation techniques. Detector 803 detects a carrier frequency of the received signal. A frequency control 804 locks to the received carrier frequency to assist detector 803 with detection. Frequency control 804 preferably is a crystal-controlled oscillator set to be compatible with the transmitter frequency (e.g., of transmitter 700). Techniques for detecting and demodulating signals received by receiver 800 are well-known to those skilled in the art. The detected output is amplified by amplifier 805 and provided through output connection 806. Output connection 806 can be coupled to any desired output device including, for example, speakers, headphones, tape recorders, computer mass-storage devices or any other output device. It would be apparent to those skilled in the art that other circuits and/or techniques known to those skilled in the audio or RF designs can be adapted for use in receiver 800 to detect the electrical inputs on leads 801a and 801b, and to provide output to output connector 806.

Figure 9:
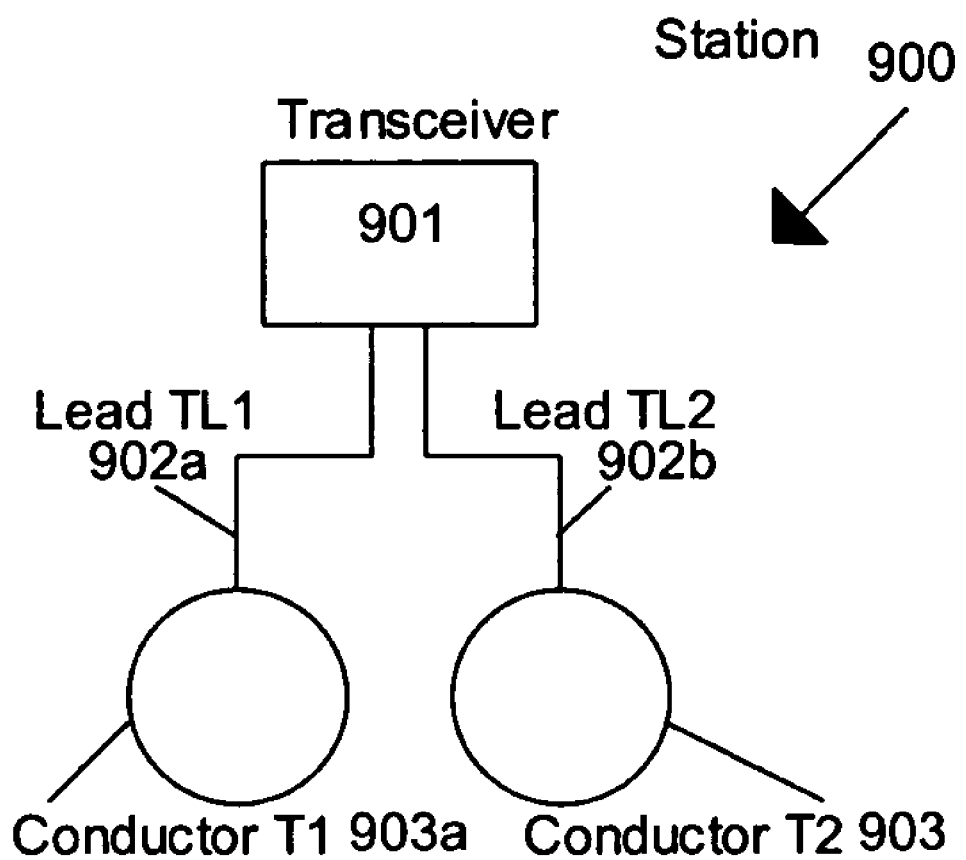
FIG. 9 is a schematic diagram of a transceiver for using an electric field to transmit and/or receive signals according to the present invention.

FIG. 9 is a schematic diagram of a transceiver station 900 according to an embodiment of the present invention. Transceiver station 900 performs both the transmitter and receiver functions in a single unit. Because bi-directional communication is desired, both transmitting and receiving functions are contained in a transceiver 901. Transceiver 901 is connected to conductors 903a and 903b by leads 902a and 902b, respectively.

Figure 10:
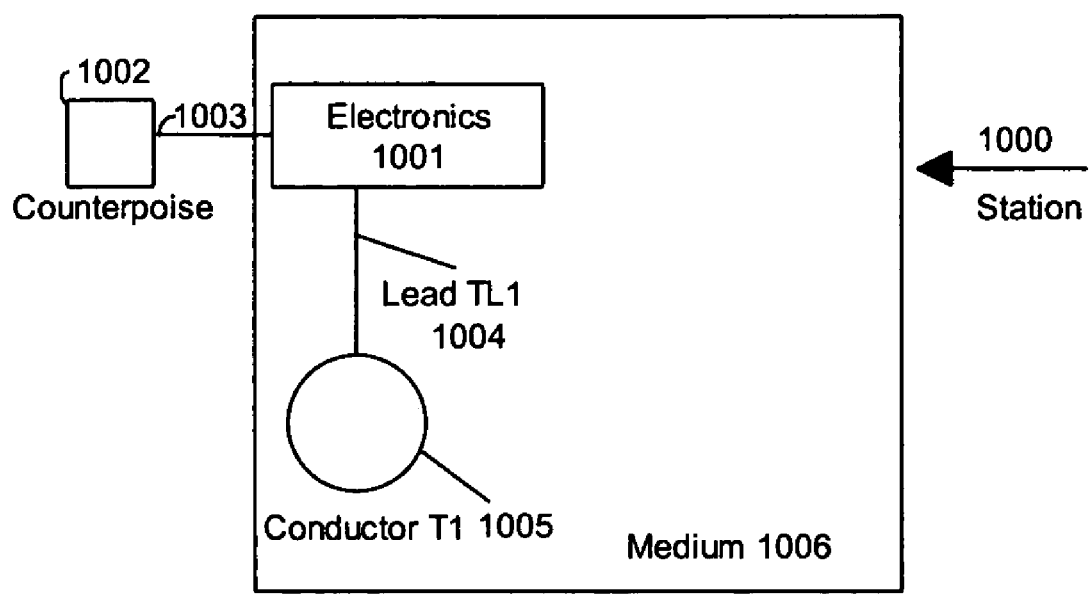
FIG. 10 is a schematic diagram of an embodiment of the present invention using one conductor and a counterpoise.

FIG. 10 is a schematic diagram of an embodiment of the present invention having a communication station 1000 that uses only a single conductor in the medium. Communication station 1000 includes electronics 1001 that perform the bulk of communication. Electronics 1001 can be a transmitter, a receiver or a transceiver. Electronics 1001 is connected via lead 1004 to a single conductor 1005. Communication station 1000 also includes a counterpoise 1002.

Counterpoise 1002, also referred to as a "virtual ground," is preferably located external to the medium 1006, such as in the air. Alternatively, counterpoise 1002 is contained in an enclosure with electronics 1001. Counterpoise 1002 is coupled to electronics 1001 via lead 1003. Counterpoise 1002 provides an electrical balance for conductor 1005. Thus, counterpoise 1002 allows the single conductor to create and/or detect an alternating electric current and corresponding electric field in the medium.

Counterpoise 1002 can be any device that accepts current from electronics 1001. Preferably, counterpoise 1002 is a conductive object such as a length of wire. Alternatively, counterpoise 1002 can be a system ground of electronics 1001, other conductive objects, or any other ground, preferably isolated from medium 1006.

Figure 11:
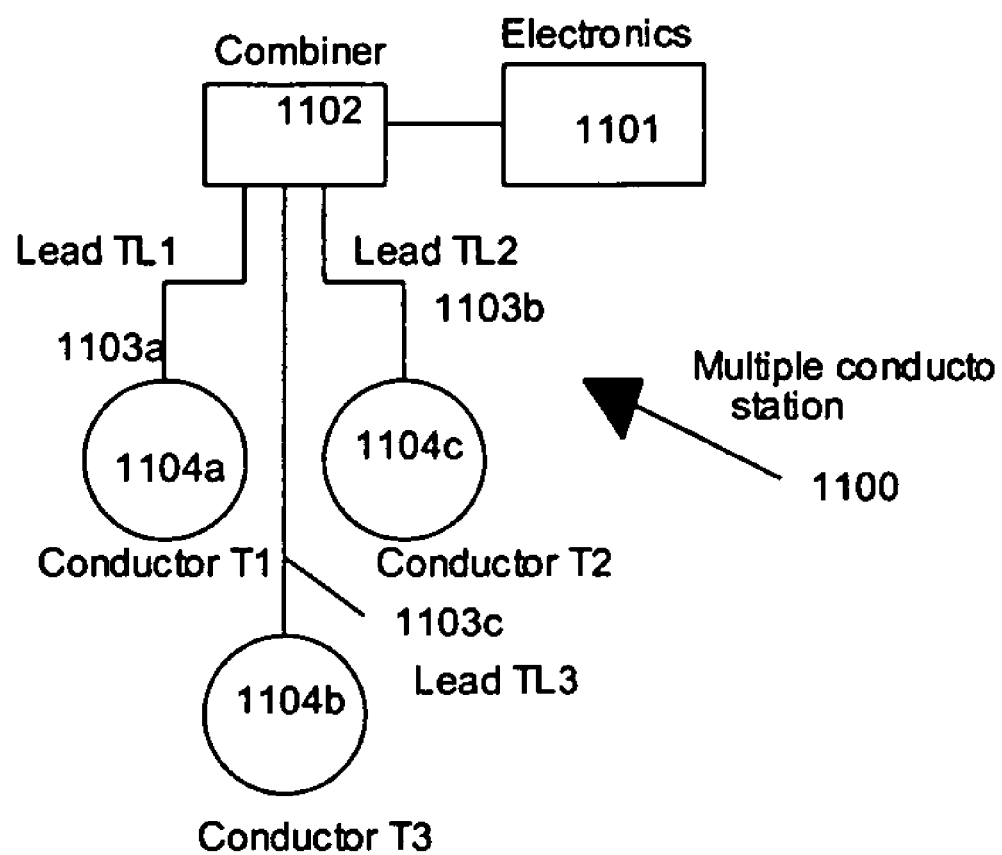
FIG. 11 is a schematic diagram of a multi-conductor unit for transmitting and/or receiving signals using an electric field according to an embodiment of the present invention.

FIG. 11 is a schematic diagram of a multi-conductor station 1100 according to an embodiment of the present invention. Multi-conductor station 1100 has more than two transmitter, receiver or bi-directional conductors. Multi-conductor station 1100 includes electronics 1101. Electronics 1101 can be a receiver, transmitter or transceiver. Electronics 1101 is connected to a combiner 1102. Combiner 1102 is connected to two or more conductors 1104a, 1104b, and 1104c through respective leads 1103a, 1103b and 1103c.

Combiner 1102 is used to select and/or add the contributions of conductors 1104a, 1104b, or 1104c. Preferably, combiner 1102 is a switch that can connect any two conductors 1104a, 1104b or 1104c to electronics 1101. Using combiner 1102, the present invention can be used as a beam-steering mechanism to select various directional characteristics of electronics 1101. Alternately, combiner 1102 can be implemented as a resistive or reactive adder to obtain a wider range of directional characteristics. As described in FIGS. 4, 5 and 6, the present invention has greatest response in a direction collinear with the selected or most highly contributing conductors 1104a, 1104b and/or 1104c.

Figure 12:
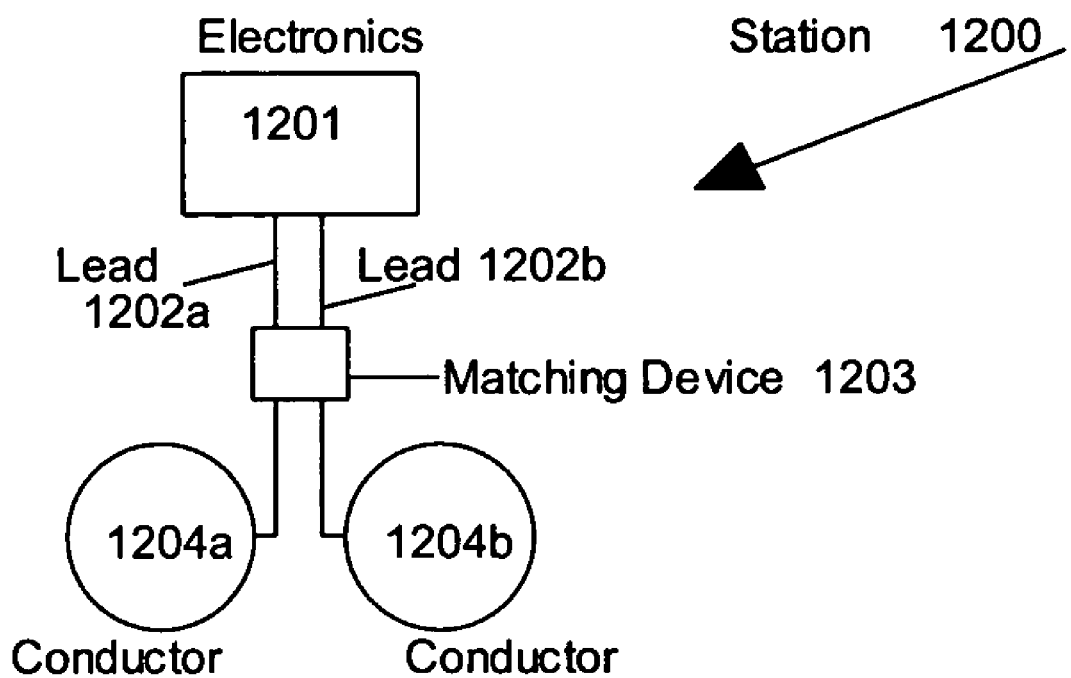
FIG. 12 is a schematic diagram of an embodiment of the present invention using impedance matching.

FIG. 12 is a schematic diagram of a station 1200 according to a preferred embodiment of the present invention that uses impedance matching to account for conductivity variations in a medium that exhibits, for example, a very high or very low conductivity. For example, saltwater is a medium that exhibits a relatively high conductivity. Station 1200 includes electronics 1201. Electronics 1201 can be a transmitter, a receiver or a transceiver. Electronics 1201 is connected through a pair of leads 1202a and 1202b to a matching device 1203. Matching device 1203 has terminals that are coupled to conductors 1204a and 1204b, respectively. When the present invention is implemented to such media, the impedance of the transmitting and/or receiving conductors 1204a and 1204b can differ significantly from that of a standard lead material. Standard lead materials include, for example, coaxial cable. Matching device 1203 accounts for this difference. Matching device 1203 is placed near conductors 1204a and 1204b. Using coaxial cable leads of approximately 50 ohms, for example, in saltwater matching device 1203 is preferably a 1:25 impedance ratio broadband transformer. It will be apparent to one of ordinary skill in the art that other impedance-matching circuits known to those skilled in audio or RF designs can be adapted for use as matching device 1203.

Station 1200 can be implemented as a single conductor or multi-conductor device as described above. In either case, one or more matching devices is used to couple the conductor or conductors to the leads.

Figure 13:
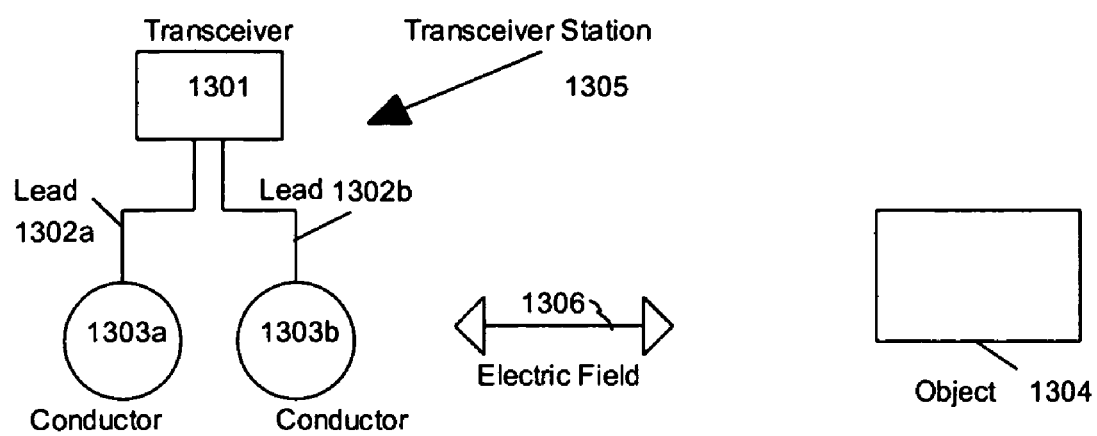
FIG. 13 is a schematic diagram of an embodiment of the present invention for detecting objects.

FIG. 13 is a schematic diagram of a transceiver station 1305 that is configured to detect objects according to an embodiment of the present invention. Transceiver station 1305 can be a single transceiver station 1305, as shown in FIG. 13. Alternatively, a separate transmitter, such as transmitter station 310, or a separate receiver station, such as receiver station 311, each of which is described above with reference to FIG. 3, could be used. Transceiver station 1305 includes a transceiver 1301. Transceiver 1301 is connected to conductors 1303a and 1303b through leads 1302a and 1302b respectively. An electrical field 1306 is created by conductors 1303a and 1303b. The presence of an object 1304 causes a change in the electric field 1306. This change, in turn, causes a change in electric field 1306 sensed by conductors 1303a and 1303b. The change is reflected in the signal detected in the receiver section of transceiver 1301.

Transceiver 1301 preferably transmits and detects pulsed signals to enable it to detect objects. Alternatively, transceiver 1301 can transmit and detect continuous waves (CW). One use of the present invention for detection of objects, is to detect objects under water.

Using a multi-conductor station, such as multi-conductor station 1100, the direction of detected object 1304 can be determined by directional arrays. The distance to object 1304 can preferably be determined through triangulation by using the directions measured by multiple transceiver stations 1305. Triangulation techniques are well known to those skilled in the art. Alternatively, a time-delay technique can be used to measure the time at which the change in field is detected at transceiver station 1305.

Figure 14:
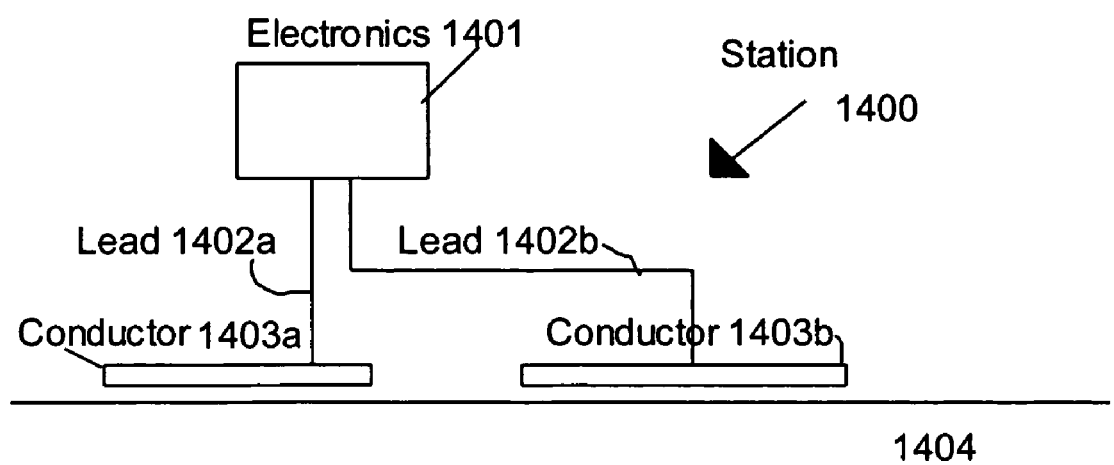
FIG. 14 is a schematic diagram of an embodiment of the present invention in which the conductors are placed at or near the boundary of an imperfectly-conducting medium.

FIG. 14 is a schematic diagram of a station 1400 for transmitting signals at or near a medium boundary according to an embodiment of the present invention. Station 1400 includes electronics 1401. Electronics 1401 can be a receiver, a transmitter or a transceiver. Electronics 1401 is connected via leads 1402 to conductors 1403a and 1403b, respectively. Conductors 1403a and 1403b are not submerged or embedded within imperfectly-conducting medium 1404. Rather, one or more of conductors 1403a and 1403b are located at or near the surface of the medium 1404. Where medium 1404 is the earth, conductors 1403a and 1403b are preferably aluminum plates having dimensions of approximately 50 cm by 30 cm. Further, conductors 1403a and 1403b are placed at a height of from 0 to 5 cm above the surface of medium 1404. Using station 1400, the present invention can be used for applications that require signaling to or from devices at or below the surface of the medium 1404. For example, where medium 1404 is the earth, the present invention can be used to communicate with devices below the surface of the earth.

Figure 15:
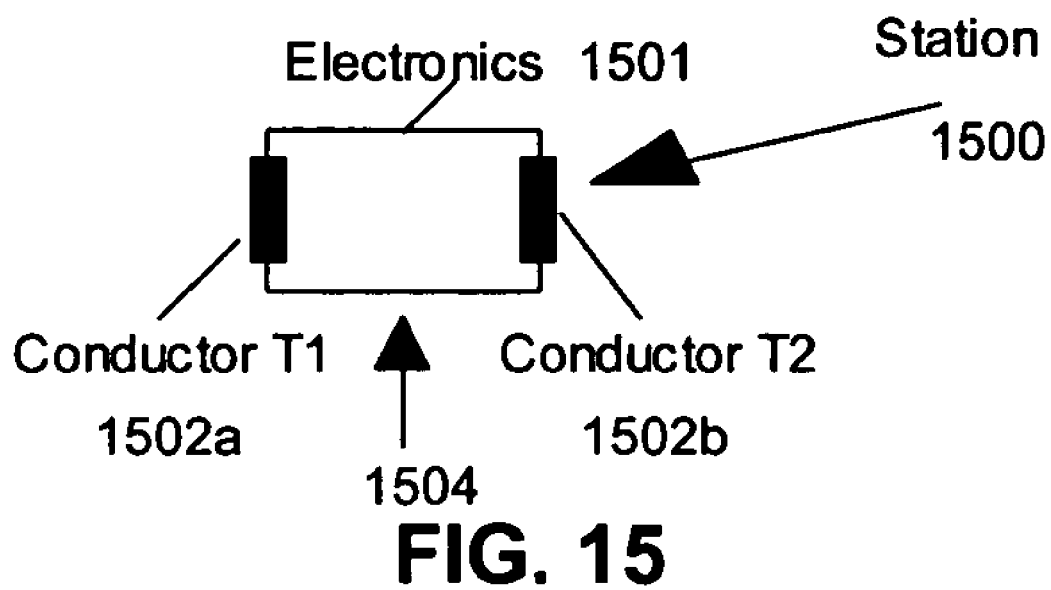
FIG. 15 is a schematic diagram of an embodiment of the present invention in which the conductors are self-contained.

FIG. 15 is a schematic diagram of a station 1500 having self-contained conductors according to an embodiment of the present invention. Station 1500 has electronics 1501. Electronics 1501 can be a transmitter, a receiver or a transceiver. Rather than use leads to connect electronics to the conductors, station 1500 contains electronics 1501 and self-contained conductors 1502a and 1502b. Conductors 1502a and 1502b are preferably aluminum panels that are attached to an insulated case. Preferably, the aluminum panels have a size of 15 cm by 10 cm, although other sizes can be used. Preferably, the insulated case is the case housing electronics 1501. Preferably, the insulated case is made out of polyethylene.

Alternatively, electronics 1501 could be housed in a case made out of a conductor such as aluminum. In this embodiment, the conductive case is used as the conductor. Preferably, the aluminum case has dimensions of 15 cm by 10 cm by 5 cm.

One or more external conductors and associated leads can perform the function of conductor 1502*b*. Thus, station 1500 can be implemented as a single conductor communication station.

Figure 16:
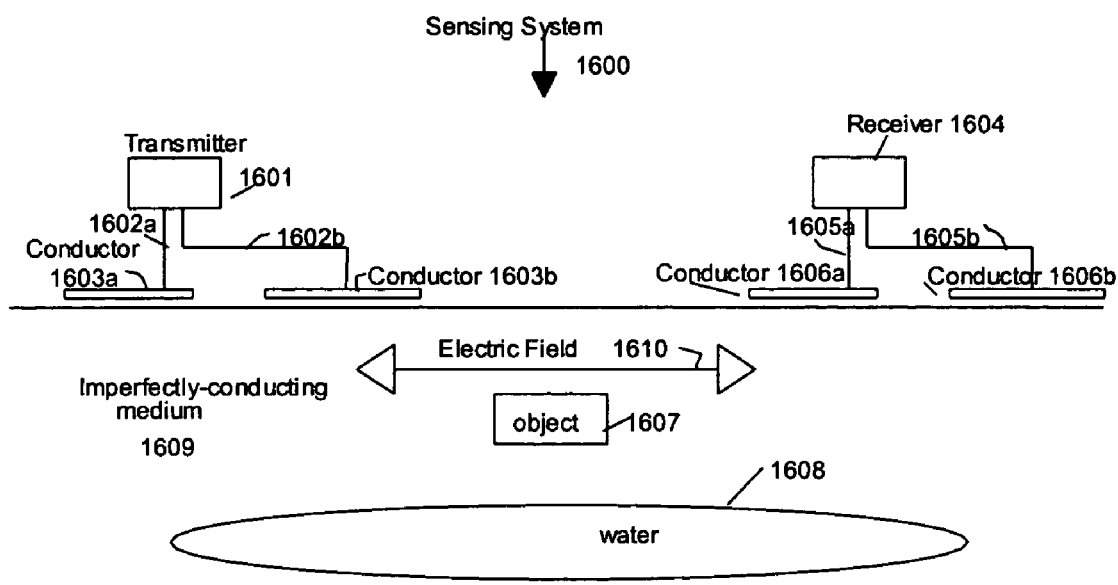
FIG. 16 is a schematic diagram of a sensing system according to an embodiment of the present invention.

FIG. 16 is a schematic diagram of a sensing system 1600 according to another embodiment of the present invention. Sensing system 1600 includes a transmitter 1601. Transmitter 1601 is coupled to conductors 1603*a* and 1603*b* through leads 1602*a* and 1602*b*, respectively. Conductors 1603*a* and 1603*b* generate an electric field 1610. Electric field 1610 induces currents in conductors 1606*a* and 1606*b*. Conductors 1606*a* and 1606*b* are coupled to a receiver 1604 through leads 1605*a* and 1605*b*, respectively. As described below, sensing system 1600 senses changes in electric field 1610 to determine properties of the medium being analyzed.

Sensing system 1600 can be used, for example, to measure properties of a medium 1609. These properties include bulk or average properties of the medium, such as conductivity. Heterogeneous properties of the medium such as the presence of an object 1607 in the medium or the presence of large structures such as underground water 1608 can be detected using the embodiment of the present invention shown in FIG. 16.

Electric field 1610 is not localized to a single line of sight. Therefore, the greater the distance between transmitter conductors 1603*a* and 1603*b* and receiver conductors 1606*a* and 1606*b* respectively, the deeper into the medium a major portion of the field will impinge, and thus the deeper into the medium data can be gathered.

Preferably, to obtain information about a structure beneath the surface, signal strength measurements are made at receiver 1604 at various distances between transmitting conductors 1603*a* and 1603*b* and receiver conductors 1606*a* and 1606*b*. These signal strength measurements can be used to generate a plot of signal strength versus conductor spacing. The slope of the plot indicates the change in conductivity as a function of depth. Sensing system 1600 can be calibrated by comparing the slope versus spacing characteristics to slope versus spacing characteristics of known regions.

Figure 17:
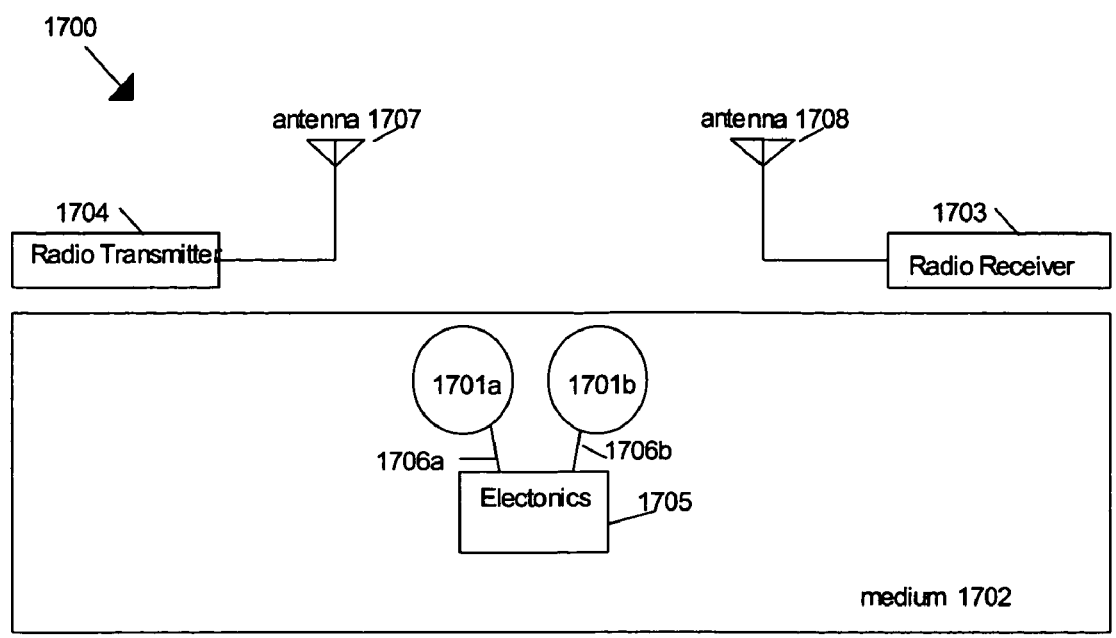
FIG. 17 is a schematic diagram of a system for using the present invention in conjunction with conventional radio transmitters or receivers.
Figure 18:
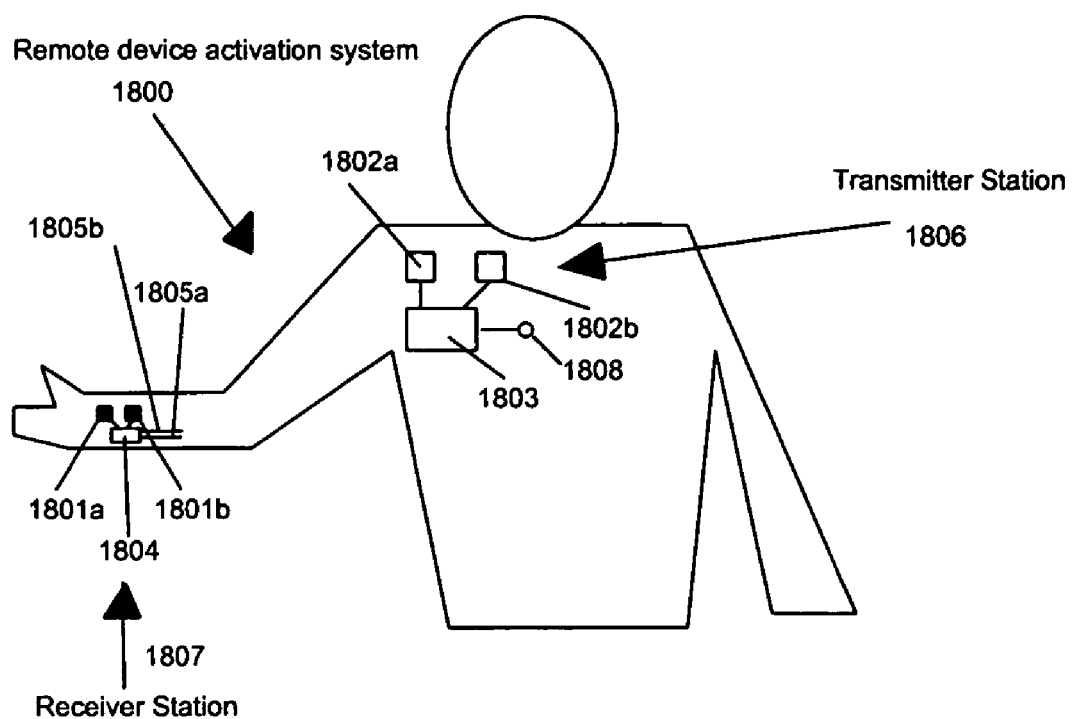
FIG. 18 is a schematic diagram for remotely activating devices according to an embodiment of the present invention.

FIG. 17 is a schematic diagram of a system 1700 that uses the present invention to communicate with a conventional radio transmitter or receiver. System 1700 includes electronics 1705. Electronics 1705 can be a receiver, transmitter or transceiver. A pair of leads 1706*a* and 1706*b* couples a pair of conductors 1701*a* and 1701*b* respectively. Preferably, conductors 1701*a* and 1701*b* are located near the surface of the conductive medium 1702. When so located, the electric field produced at conductors 1701 at the surface will generate electromagnetic waves which can propagate outside the conductive medium and be received at a conventional radio receiver 1703 with a conventional radio antenna 1708. Likewise, radio signals generated by a conventional radio transmitter 1704, using a conventional radio antenna 1707, can be received by the conductors 1701*a* and 1701*b* by the inverse mechanism. This configuration of the invention is most practical when conductors 1701*a* and 1701*b* are located quite near the surface, preferably within one to two meters, and frequencies are relatively high, preferably above 100 kHz., FIG. 18 is a schematic diagram of a system 1800 that uses the present invention to activate a device using wireless signals. System 1800 is described herein in a medical context. However, system 1800 can have a wide range of applicability for activating devices remotely. For example, system 1800 can be used with wireless devices placed in otherwise inaccessible locations to control their operation.

System 1800 includes a receiver station 1807. Receiver station 1807 includes or is coupled to the wireless device to be activated. Receiver station includes a pair of electrodes 1805*a* and 1805*b*. Electrodes 1805*a* and 1805*b* are preferably a pair of neuroprosthetic electrodes, such as are used to restore motor control to paralyzed individuals. One end of each of electrodes 1805*a* and 1805*b* is coupled to the body or medical device. The other end of each of electrodes 1805*a* and 1805*b* is connected to the output of a receiver 1804 included in receiver station 1807.

Receiver station 1807 also includes receiver conductors 1801*a* and 1801*b* that are coupled to receiver 1804. Receiver conductors 1801*a* and 1801*b* preferably made of a biologically-compatible conductive material. Power for receiver 1804 is preferably obtained from signals received by conductors 1801*a* and 1801*b*. Alternatively, power for receiver 1804 is provided by an implanted battery pack or by inductive coupling. The needed materials and designs are known to those skilled in the art of implanted medical devices.

In operation, hardware or software logic within receiver 1804 interprets commands initiated at a transmitter station 1806 to generate signals to electrodes 1805*a* and 1805*b* of the proper format. The needed electrode signals and designs are known to those skilled in the art of neuroprosthetic control, see Kilgore, Kevin, et. al., "An Implanted Upper-Extremity Neuroprosthesis", Journal of Bone and Joint Surgery, Vol. 79-A, Nr. 4, April, 1997.

System 1800 also includes a transmitter station 1806 that generates the required control signals to activate the wireless device. For medical device applications, the power lever of transmitter 1803 is on the order of milliwatts. Further, in medical device application, receiver conductors 1801*a* and 1801*b* have maximum dimensions of approximately 5 cm and transmitter conductors 1802*a* and 1802*b* preferably will have dimensions of approximately 5 cm. When used in medical device applications, transmitter electronics 1803 and transmitter conductors 1802*a* and 1802*b* are preferably mounted on the skin of the user. Alternatively, one or more of these components is embedded within the body. Input signals, for example, from a shoulder-motion sensor, see Kilgore, et. al., are interfaced to transmitter input connector 1808.

Multiple receiver stations 1807 can be controlled by a single transmitter station 1806 using unique command codes or different frequencies to each receiver station 1807.

The present invention can be used for other embodiments of medical device control, including, for example, as pacemakers, glucose and other blood sensors, and chemical release activators by those with ordinary skill in the art.

Figure 19:
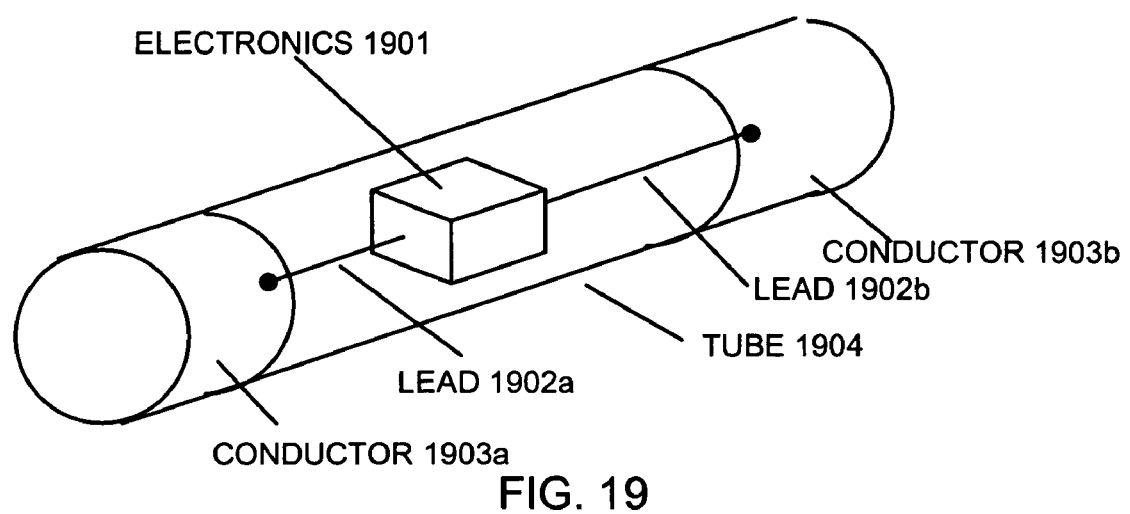
FIG. 19 is a schematic diagram of a conductor pair for use in an embodiment of the present invention.

FIG. 19 is a schematic diagram is another embodiment of the exemplary transmitting and receiving antennas that can be used in the present invention. An insulating tube 1904, such as PVC pipe provides structural support. Metal sheets 1903*a* and 1903*b* are wrapped around the tube, near its ends, to serve as conductors. Metal sheets 1903*a* and 1903*b* can be made of a material such as aluminum flashing. Insulated wires 1902a and 1902b running inside the tube connects the wiring to the conductor 1903a and 1903b respectively. Electronics 1901 can either be included within the tube, or a transmission line can be run from the tube to external electronics. Electronics 1901 can be a receiver, transmitter or transceiver.

Figure 20:
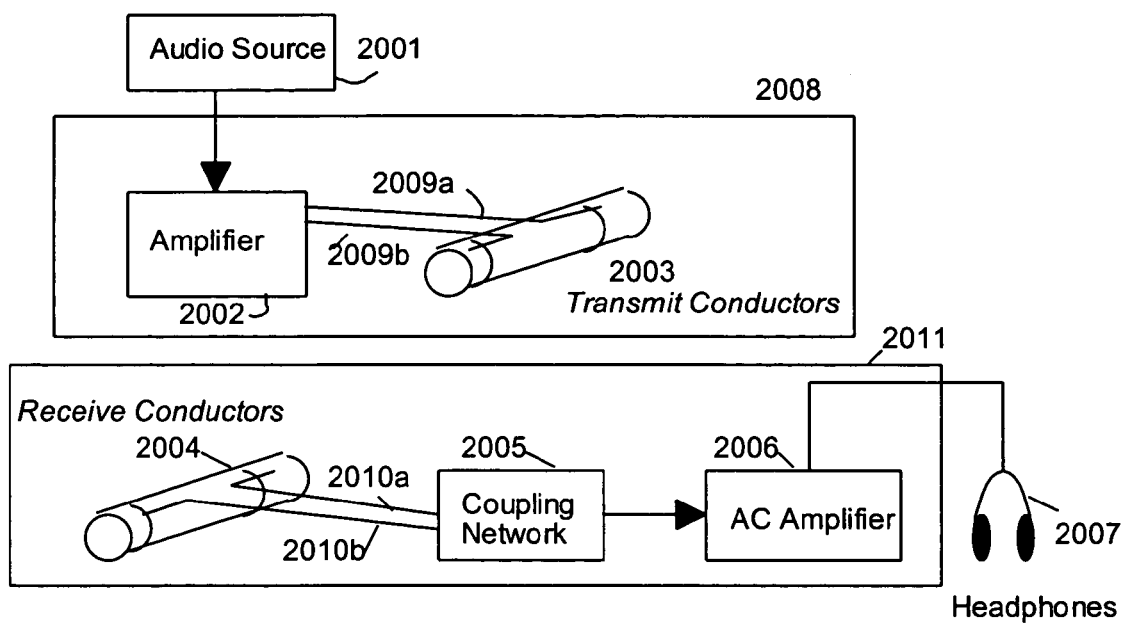
FIG. 20 is a schematic diagram of a system for transmitting signals using an electric field according to another embodiment of the present invention.

FIG. 20 is a schematic diagram of another embodiment of the present invention. An audio source 2001 generates an audio-frequency signal. Audio source 2001 can be any audio source. For example, audio source 2001 can be an oscillator that generates a beacon. Alternatively, audio source 2001 can be a microphone. The output of audio source 2001 is sent to a transmitter 2008. Transmitter 2008 includes an amplifier 2002 and transmit conductors 2003. The output of audio source 2001 is amplified by an amplifier 2002. Transmit conductors 2003 are driven by the amplified audio signal through leads 2009a and 2009b. Where audio source 2001 is an oscillator, for example, transmit conductors 2003 are driven at the frequency of the oscillator. The signal sent by transmitter 2008 is received by a receiver 2011. Receiver 2011 includes receiving conductors 2004. The receiving conductors 2004 receive the signal transmitted by transmitting conductors 2003. The received signal travels through leads 2010a and 2010b and is coupled to an amplifier 2006 through a coupling network. Amplifier 2006 amplifies the received signal to directly drive headphones 2007 or a speaker so that the information from transmitter can be heard by the user. Coupling network 2005 can be a simple audio frequency transformer to match the impedance of the receiver conductors to the amplifier input, as can be done by one with ordinary skill in electronics design. In many locations, substantial 50 Hz or 60 Hz hum will be picked up by conductors 2004, so that coupling network 2005 preferably will reject those frequencies. Methods for rejecting the hum include, for example, high-pass or band pass filtering. Such methods are known to those with ordinary skill in analog electronics design. Coupling network 2005 and/or transmitter amplifier 2002 could be omitted to minimize complexity. However, elimination of these elements can result in possible reduction in signal strength and range.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for transmitting signals through an imperfectly-conducting medium comprising:
   a transmitter station, the transmitter station comprising:
      a transmitter, and one or more transmitter conductors coupled to the transmitter, wherein the transmitter causes a signal to be transmitted to be coupled to the transmitter conductors to cause a current to flow in the imperfectly-conducting medium, thereby creating an electric field corresponding to the signal to be transmitted;
   a receiver station, the receiver station comprising:
      a receiver, and
      one or more receiver conductors coupled to the receiver through one or more leads, wherein the receiver conductors receive the signal to be transmitted by sensing the electric field; and
   analysis means, wherein the received signal is analyzed to determine characteristics or features of the imperfectly-conducting medium.

2. The system recited in claim 1, wherein the transmitter station and the receiver station are contained in a single-unit transceiver.

3. The system recited in claim 1, wherein one of the receiver station and the transmitter station has a single conductor.

4. The system recited in claim 1, wherein either or both the transmitter station or the receiver station is not submerged in the imperfectly-conducting medium.

5. The system recited in claim 1, wherein the analysis means comprises means to determine a property of the imperfectly-conducting medium.

6. The system recited in claim 1, wherein the transmitter conductors are submerged in the imperfectly-conducting medium and wherein the analysis means comprises means to use changes in the electric field to determine the presence of an object in the imperfectly-conducting medium.

7. The system recited in claim 1, wherein the receiver station further comprises;
   more than two conductors, and
   a combiner for selecting signals from two of the conductors, for input to the receiver, whereby the orientation and strength of the electric field can be measured.

8. The system recited in claim 7, wherein the system finds the greatest signal strength of the available conductor pairs.

9. The system recited in claim 1, wherein the receiver station further comprises;
   more than two conductors, and
   a combiner which connects the conductors into two connected groups, for input to the receiver.

10. The system recited in claim 9, wherein the system finds the greatest signal strength of the available connected groups of conductors.

11. A system for transmitting signals through an imperfectly-conducting medium comprising:
   a transmitter that causes a signal to be transmitted;
   a receiver;
   a first wireless propagation path within the imperfectly-conducting medium, wherein an electrical field corresponding to the signal is produced;
   a second wireless propagation path not within the imperfectly-conducting medium, wherein an electromagnetic field corresponding to the signal is produced;
   a set of one or more conductors coupled to the imperfectly-conducting medium and to either the transmitter or the receiver through one or more leads; and output means for outputting the received signal, whereby the signal to be transmitted propagates through the first wireless propagation path and through the second wireless propagation path from the transmitter to the receiver.

12. The system recited in claim 11, wherein the imperfectly-conducting medium is water.

13. The system recited in claim 11, wherein the imperfectly-conducting medium is the earth.

14. The system recited in claim 11, wherein the set of one or more conductors is coupled to the receiver, further comprising
- a single transmit conductor coupled to the transmitter through a lead and coupled to the imperfectly-conducting medium and
- a counterpoise coupled to the transmitter through a lead and not coupled to the imperfectly-conducting medium, whereby an electric field is created in the imperfectly-conducting medium.

15. The system recited in claim 14, wherein the counterpoise is self-contained with the transmitter.

16. The system recited in claim 11, wherein the transmitter and receiver conductors are self-contained.

17. The system recited in claim 11, wherein one or more of the set of conductors comprises a metallic material having a length and width much greater than its thickness, whereby the relative surface area that couples to the imperfectly-conducting medium is large with respect to the amount of the metallic material.

18. A method for transmitting a wireless signal through an imperfectly-conducting medium comprising the steps of:
- generating a signal to be transmitted through the imperfectly-conducting medium;
- generating a wireless electric field within the imperfectly-conducting medium corresponding to the signal;
  - generating a wireless electromagnetic field outside or along the boundary of the imperfectly-conducting medium corresponding to the electric field;
- sensing the electromagnetic field to detect the signal; and
- outputting the signal.

19. The method recited in claim 18, further comprising the step of detecting characteristics or features of the imperfectly-conducting medium.

20. The method recited in claim 18, further comprising the step of determining the orientation of the electric field.

21. The method recited in claim 18, further comprising the step of determining a property of the imperfectly-conducting medium.

* * * * *